(12) United States Patent
Richardson et al.

(10) Patent No.: US 6,847,879 B1
(45) Date of Patent: Jan. 25, 2005

(54) METHOD OF CONTROLLING TORQUE CONVERTER CLUTCH SLIP

(75) Inventors: Roland T Richardson, Detroit, MI (US); Yi Cheng, Ypsilanti, MI (US); Pubudu Peiris, Windsor (CA); David Parenti, Waterford, MI (US); Gang Chen, Rochester Hills, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/769,222

(22) Filed: Jan. 30, 2004

(51) Int. Cl.[7] .................................................. G06F 7/00
(52) U.S. Cl. ......................... 701/67; 701/54; 701/110
(58) Field of Search ............................... 701/51, 53, 54, 701/82, 67, 101, 110; 477/62, 156, 168; 475/116, 120

(56) References Cited

U.S. PATENT DOCUMENTS

| | | | |
|---|---|---|---|
| 4,993,527 A | | 2/1991 | Benford et al. |
| 5,413,539 A | | 5/1995 | Leonard et al. |
| 6,095,117 A | * | 8/2000 | Minowa et al. .............. 123/399 |
| 6,434,466 B1 | | 8/2002 | Robichaux et al. |
| 6,434,472 B1 | * | 8/2002 | Minowa et al. ............... 701/96 |
| 6,684,148 B2 | * | 1/2004 | Chess ........................... 701/95 |
| 6,701,246 B2 | * | 3/2004 | Riedle et al. ................ 701/110 |

\* cited by examiner

*Primary Examiner*—Richard M. Camby
(74) *Attorney, Agent, or Firm*—Ralph E. Smith

(57) ABSTRACT

A method for controlling slip in an EMCC equipped torque converter is provided. The method determines whether an EMCC slip rate exceeds a predetermined RPM, determines whether a crankshaft RPM acceleration exceeds a predetermined rate, reduces an output torque of an engine in response to one of said EMCC slip rate exceeding said predetermined RPM and said crankshaft RPM acceleration exceeding said predetermined rate; and disables said output torque of an engine in response to said EMCC slip rate being less than said predetermined RPM and said crankshaft RPM acceleration being less than said predetermined rate.

12 Claims, 2 Drawing Sheets

METHOD OF CONTROLLING TORQUE CONVERTER CLUTCH SLIP

FIELD OF THE INVENTION

This invention relates generally to a method for controlling the slip rate in a lockup type torque converter, and more particularly to where such slip rate is controlled by regulating engine torque at the driven input of the torque converter during steady-state operation.

BACKGROUND

Modern vehicle powertrains employ a hydraulic torque converter to couple engine torque to an automatic transmission. As is known in the art, the torque converter has an input member driven by the engine, and an output member coupled to the input of the transmission. The torque converter's input and output members each have a turbine, and the turbines are immersed in, and rotationally coupled through, a hydraulic fluid. The hydraulic fluid and turbines do not, however, provide a 100% coupling of rotational speed between the input and output members. An electronically modulated converter clutch (EMCC) may therefore be used in addition to the turbines to selectively and gradually increase coupling between the input and output members. Such an arrangement is disclosed in commonly-owned U.S. Pat. No. 4,993,527.

Completely coupling the input and output members with an EMCC provides a fuel economy benefit, however complete coupling may also cause undesirable noise, vibration, and harshness (NVH) responses in the vehicle driveline. The primary cause of these NVH characteristics is torsional vibration from cylinder firings in the engine. It is therefore desirable to allow a limited amount of EMCC slip to dampen the vibrations. EMCC slip is the RPM difference between the torque converter's input and output members. But because the coefficient of friction between the input and output members of the EMCC varies with several independent variables, such as component wear and temperature, the slip is often oscillatory in nature and introduces NVH issues of its own. Therefore, allowing limited slip during steady state vehicle operation has been an elusive goal.

SUMMARY OF THE INVENTION a method for using the EMCC to couple the input and output members to as great a degree as possible without introducing undesirable NVH responses in the driveline.

In accordance with this desire, a method for controlling slip in an EMCC equipped torque converter is provided. The method determines whether an EMCC slip rate exceeds a predetermined RPM, determines whether a crankshaft RPM acceleration exceeds a predetermined rate, reduces an output torque of an engine in response to one of said EMCC slip rate exceeding said predetermined RPM and said crankshaft RPM acceleration exceeding said predetermined rate; and disables said output torque of an engine in response to said EMCC slip rate being less than said predetermined RPM and said crankshaft RPM acceleration being less than said predetermined rate.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION

Figure 1:
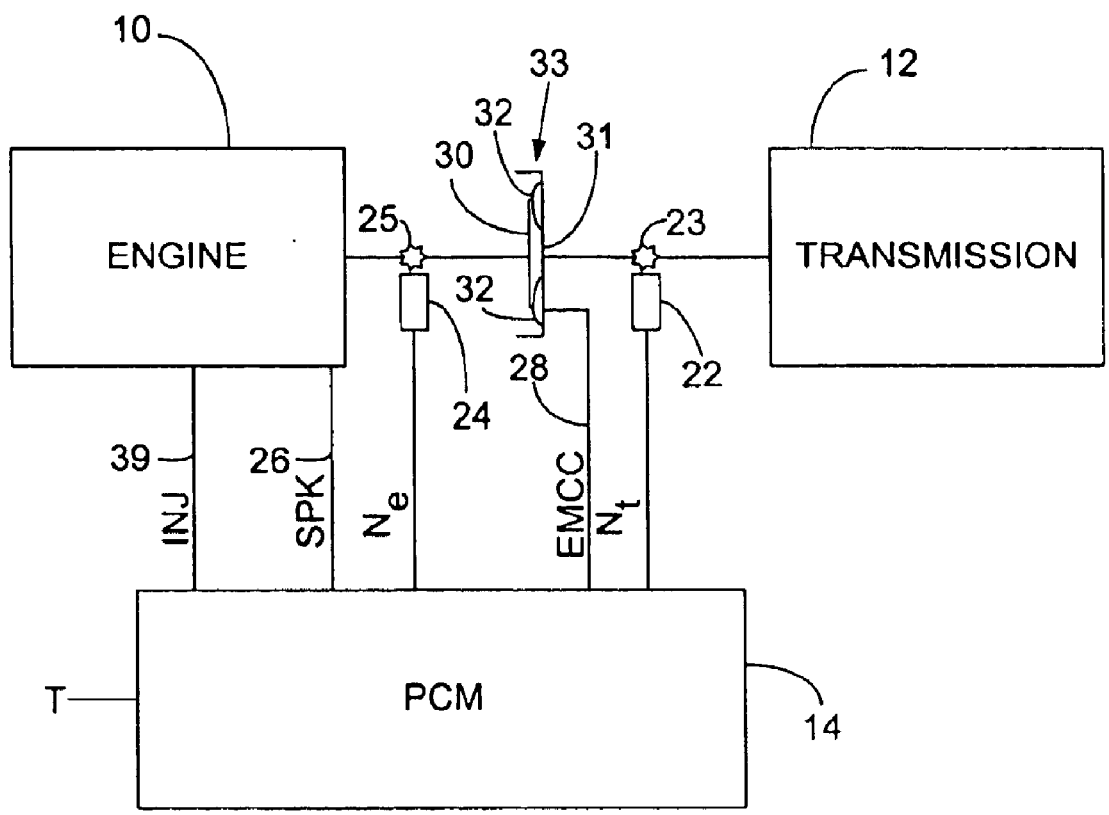
FIG. 1 depicts a block diagram of a powertrain system.

Turning to FIG. 1, a block diagram of a powertrain system is shown. A torque converter 33 has an input member 30 and an output member 31 which are hydrostatically coupled as is known in the art. An EMCC has clutch pads 32 which couple its input 30 and output 31 members to varying degrees. The clutch pads 32 provide the varying coupling in response to an EMCC signal 28.

An engine 10 has a crankshaft connected to the input member 30. An engine speed sensor 24 detects rotation of a crankshaft target wheel 25, which rotates together with the crankshaft, and provides a signal indicative of engine RPM, $N_e$.

A transmission 12 is connected to output member 31 by an input shaft. An input shaft speed sensor 22 detects rotation of an input shaft target wheel 23, which rotates together with the input shaft, and provides a signal indicative of input shaft RPM, $N_t$.

A powertrain control module (PCM) 14 receives the signal from crankshaft sensor 24 and calculates engine RPM, $N_e$, therefrom. A throttle pedal position signal T provides PCM 14 with a signal indicative of a throttle pedal position as it is manipulated by a vehicle driver. The PCM 14 segment selectively reduces crankshaft torque output of engine 10 by retarding the engine ignition timing via a SPK output 26. Selective reduction of torque occurs in accordance with the later described method of the invention. A fuel injector control output 39 may also be used to selectively reduce crankshaft torque in the case of a diesel engine by reducing a fuel flow rate.

The PCM 14 further receives the input shaft signal from an input shaft speed sensor 22 and derives an input shaft RPM, $N_t$, therefrom. An EMCC signal 28 controls the EMCC clutch pads 32 to selectively increase and decrease slip between the input 30 and output 31 members.

Figure 2:
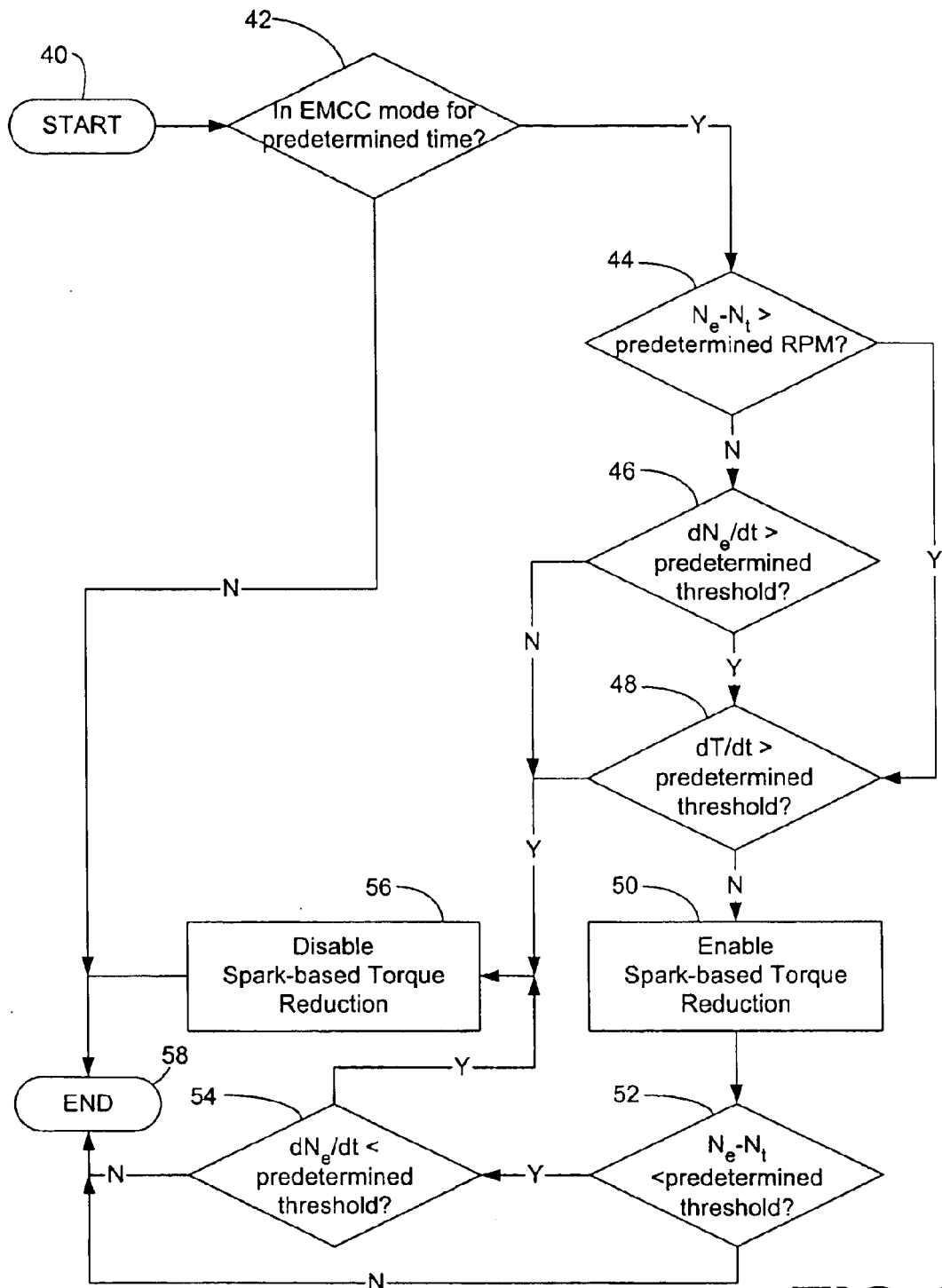
FIG. 2 depicts a flowchart of a method for controlling EMCC clutch slip.

Turning now to FIG. 2, a method for controlling EMCC slip is shown. In one aspect the method is executed by the PCM 14, however it may be executed by any powertrain control architecture which has access to the requisite inputs and outputs. The method is entered at block 40 after the powertrain system has entered an EMCC operating mode. Entering the EMCC mode requires that the vehicle be driven at a moderate and steady speed and the throttle position T to be less than a predetermined limit for some amount of time. An example of such a driving condition is operating the vehicle at between 40 to 50 MPH and between 1% and 25% of maximum throttle position for at least five seconds. Once the EMCC mode is entered, the transmission control element 16 asserts the EMCC output, causing the EMCC clutch pads 32 to reduce slip between the input and output elements 30, 31.

The method of FIG. 2 is executed periodically, for example every seven milliseconds, once the powertrain system has entered the EMCC mode of operation. The method is preferably stored in a computer memory and executed by a microcontroller within the PCM 14. Beginning at block 40, the method proceeds to decision block 42 determines whether the system has been in an EMCC mode for at least a predetermined amount of time. If the system has not been in an EMCC mode for a sufficient time, for example 350 milliseconds, then the method exits at block 58 to be executed at a later period.

If the query of decision block 42 returns an affirmative result, the method proceeds to decision block 44 and determines whether the EMCC slip rate, or $N_e$-$N_t$, is greater than a predetermined value, such as 30 RPM. If the determination is negative, the method proceeds to block 46 and determines whether the engine RPM is increasing at greater than a predetermined rate. If not, the method disables spark-based torque reduction at block 56, which will be described later.

Returning to block 44, if the determination is positive, then the method proceeds to decision block 48. In decision block 48 the method determines whether the throttle position signal is increasing at greater than a predetermined rate, which provides an indication that the vehicle operator desires to accelerate. If so, the method again proceeds to block 56 and disables spark-based torque reduction.

Returning to decision block 48, if the throttle is not opening at greater than a predetermined rate, then the excessive slip detected at decision block 44, or the increasing engine RPM detected at decision block 46, are likely caused by a momentary decrease in the degree of coupling between the input 30 and output 31 members. In this case, the method moves from decision block 48 to block 50. In block 50 the PCM 14 reduces engine torque to eliminate the excessive slip or increasing engine RPM. In one aspect, the PCM reduces engine torque by retarding the ignition timing via the SPK output 26. Engine torque reduction may also be accomplished by reducing combustion air or fuel flow as may be possible in an engine having an electronic throttle body or diesel engine, respectively. The torque reduction may also be limited to predetermined amount, such as, such as 25 Nm.

Once the torque reduction has been made, the method proceeds to block 52 and determines whether excessive slip remains despite the torque reduction established in block 50. If so, the method exits via block 58, thereby leaving the torque reduction in place until the next periodic execution of the method. Returning to block 52, if the determination is negative, the method proceeds to block 54 and determines whether the rate of engine RPM increase has fallen to less than the predetermined rate. If so, the method proceeds to block 56 and disables the torque reduction for the remainder of the method's periodic execution cycle. However, if the result of the decision block 54 query is negative, the method exits via block 58, leaving the torque reduction in place until the next periodic execution of the method.

What is claimed is:

1. A method for controlling slip in an EMCC equipped torque converter, the method comprising:
   determining whether an EMCC slip rate exceeds a predetermined RPM;
   determining whether a crankshaft RPM acceleration exceeds a predetermined rate;
   reducing an output torque of an engine in response to one of said EMCC slip rate exceeding said predetermined RPM and said crankshaft RPM acceleration exceeding said predetermined rate; and
   disabling said output torque of an engine in response to said EMCC slip rate being less than said predetermined RPM and said crankshaft RPM acceleration being less than said predetermined rate.

2. The method of claim 1 wherein said step of reducing an output torque of an engine is accomplished by retarding an ignition timing of said engine.

3. The method of claim 1 wherein said step of reducing an output torque of an engine is accomplished by reducing a fuel flow delivered to said engine.

4. The method of claim 1 further comprising disabling said output torque of said an engine in response to a throttle position signal increasing at greater than a predetermined rate.

5. In a vehicle powertrain system having an engine coupled to a transmission via an EMCC-equipped torque converter, a powertrain control module (PCM) comprising:
   means for determining an EMCC slip rate;
   means for reducing an output torque of the engine;
   means for determining an RPM acceleration rate of the engine;
   said means for reducing an output torque of the engine effecting an engine output torque reduction in response to one of said EMCC slip rate exceeding a predetermined RPM and said RPM acceleration being greater than a predetermined amount, said means for reducing an output torque of the engine terminating said engine output torque reduction in response to said EMCC slip rate being less than said predetermined RPM and said RPM acceleration being less than said predetermined amount.

6. The PCM of claim 5 wherein said means for reducing an output torque of the engine comprises an output for retarding an ignition timing of the engine.

7. The PCM of claim 5 wherein said means for reducing an output torque of the engine comprises an output for reducing a fuel flow delivered to said engine.

8. The PCM of claim 5 further comprising an input for a throttle position signal, wherein said terminating said engine output torque reduction further comprises terminating said engine output torque reduction in response to said throttle position signal increasing at greater than a predetermined rate.

9. In a vehicle powertrain system comprising:
   an engine coupled to a transmission via an EMCC-equipped torque converter;
   a powertrain control module (PCM) having an input for signal indicative of an engine RPM, an input for a signal indicative of a transmission input shaft RPM, an output for reducing an output torque of said engine, a means for determining an RPM acceleration of said engine RPM; and a means for determining an EMCC slip rate between said engine RPM and said transmission input shaft RPM;
   said PCM output for reducing an output torque of said engine effecting an output torque reduction of said engine in response to one of said EMCC slip rate exceeding a predetermined RPM and said RPM acceleration being greater than a predetermined amount, said output for reducing said output torque of said engine terminating said engine output torque reduction in response to said EMCC slip rate being less than said predetermined RPM and said RPM acceleration being less than said predetermined amount.

10. The system of claim 9 wherein said PCM of claim 5 wherein said means for reducing an output torque of the engine comprises an output for retarding an ignition timing of the engine.

11. The PCM of claim 9 wherein said PCM output for reducing an output torque of said engine comprises an output for reducing a fuel flow delivered to said engine.

12. The PCM of claim 9 further having an input for a throttle position signal, wherein said output for reducing said output torque of said engine also terminates said engine output torque reduction in response to said throttle position signal increasing at greater than a predetermined rate.

* * * * *